United States Patent
Ling

(10) Patent No.: US 12,254,187 B2
(45) Date of Patent: Mar. 18, 2025

(54) METHOD, DEVICE, AND COMPUTER PROGRAM PRODUCT FOR PROCESSING COMPRESSED DATA

(71) Applicant: Dell Products L.P., Round Rock, TX (US)

(72) Inventor: Qinghua Ling, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/128,448

(22) Filed: Mar. 30, 2023

(65) Prior Publication Data

US 2024/0111428 A1 Apr. 4, 2024

(30) Foreign Application Priority Data

Sep. 30, 2022 (CN) .......................... 202211211484.5

(51) Int. Cl.
G06F 3/06 (2006.01)
(52) U.S. Cl.
CPC .......... *G06F 3/0613* (2013.01); *G06F 3/0656* (2013.01); *G06F 3/0689* (2013.01)
(58) Field of Classification Search
CPC ..... G06F 3/0613; G06F 3/0656; G06F 3/0689
USPC .................................................. 711/154, 100
See application file for complete search history.

(56) References Cited

U.S. PATENT DOCUMENTS

| | | | |
|---|---|---|---|
| 6,366,289 B1* | 4/2002 | Johns | G09G 5/39 345/543 |
| 6,625,671 B1* | 9/2003 | Collette | G06F 13/4059 710/33 |
| 8,667,212 B2 | 3/2014 | McWilliams et al. | |
| 8,880,862 B2 | 11/2014 | Fallon et al. | |
| 9,122,579 B2 | 9/2015 | Flynn et al. | |
| 9,432,298 B1 | 8/2016 | Smith | |
| 2020/0225655 A1 | 7/2020 | Cella et al. | |
| 2021/0117328 A1* | 4/2021 | Chen | G06F 3/0656 |
| 2022/0084156 A1* | 3/2022 | Kothandaraman | G06F 16/907 |
| 2023/0236725 A1* | 7/2023 | Madan | G06F 12/1408 711/103 |

* cited by examiner

*Primary Examiner* — Hosain T Alam
*Assistant Examiner* — Zubair Ahmed
(74) *Attorney, Agent, or Firm* — BainwoodHuang

(57) ABSTRACT

Techniques for processing compressed data involve: determining, based on parsing of a header of a compressed data packet, a size of original data corresponding to compressed data, wherein the compressed data packet comprises the header, compressed metadata, and the compressed data. The techniques further involve: allocating, based on the size of the original data, a shared buffer space for receiving and converting the compressed metadata and the compressed data; and storing the compressed data packet in the shared buffer space. The shared buffer space can be used for the receiving and conversion processing of compressed data at the same time, without allocating a separate buffer space for each processing, thereby improving the memory efficiency. Since the allocated shared buffer space is used for both receiving processing and conversion processing, the complexity of configuration of a memory pool is also reduced.

13 Claims, 8 Drawing Sheets

METHOD, DEVICE, AND COMPUTER PROGRAM PRODUCT FOR PROCESSING COMPRESSED DATA

CROSS-REFERENCE TO RELATED APPLICATION

This application claims priority to Chinese Patent Application No. CN202211211484.5, on file at the China National Intellectual Property Administration (CNIPA), having a filing date of Sep. 30, 2022, and having "METHODS, APPARATUSES, AND COMPUTER PROGRAM PRODUCTS FOR PROCESSING COMPRESSED DATA" as a title, the contents and teachings of which are herein incorporated by reference in their entirety.

TECHNICAL FIELD

Embodiments of the present disclosure relate generally to the technical field of data storage, and more specifically to a method, a system, and a computer program product for processing compressed data.

BACKGROUND

Enterprise-level storage arrays typically have compression features for the purpose of data reduction. When a host issues a write input-output (IO) request, user data will be first cached and committed, and then returned to the host. After that, the data will be flushed to a redundant array of independent disks (RAID), and compression is enabled at the back end. When the host reads the data, if the cache is hit, the data is returned directly from the cache, and if not hit, the compressed data is loaded from the back end and is decompressed, and the decompressed data is then filled into the cache and returned to the host.

However, for the purpose of data efficiency, native replication often requires that the data be read in a compressed format and then the compressed data be sent over a transmission line. A remote array receives the compressed data and then converts it so as to recover the original layout of the compressed data. Next, the compressed data is decompressed and then written to the back end.

SUMMARY OF THE INVENTION

Embodiments of the present disclosure provide a method, a device, and a computer program product for processing compressed data.

In a first aspect of the present disclosure, a method for processing compressed data is provided. The method includes: determining, based on parsing of a header of a compressed data packet, a size of original data corresponding to compressed data, wherein the compressed data packet includes the header, compressed metadata, and the compressed data; allocating, based on the size of the original data, a shared buffer space for receiving and converting the compressed metadata and the compressed data; and storing the compressed data packet in the shared buffer space.

In another aspect of the present disclosure, a device for processing compressed data is provided. The device includes a processor and a memory, wherein the memory is coupled to the processor and stores instructions that, when executed by the processor, cause the device to perform the following actions: determining, based on parsing of a header of a compressed data packet, a size of original data corresponding to compressed data, wherein the compressed data packet includes the header, compressed metadata, and the compressed data; allocating, based on the size of the original data, a shared buffer space for receiving and converting the compressed metadata and the compressed data; and storing the compressed data packet in the shared buffer space.

In still another aspect of the present disclosure, a computer program product is provided. The computer program product is tangibly stored in a non-transitory computer-readable medium and includes computer-executable instructions, wherein the computer-executable instructions, when executed, cause a computer to execute the method or process according to the embodiments of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
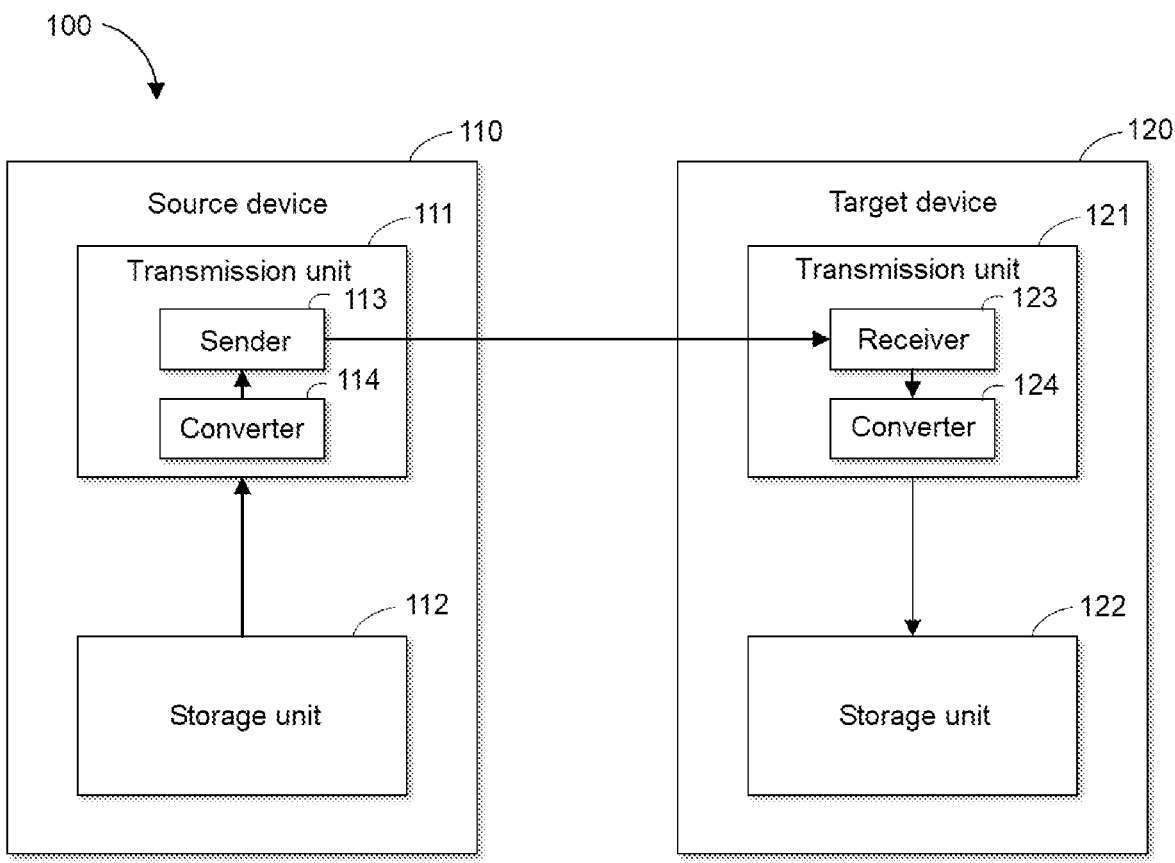
FIG. 1 illustrates a schematic diagram of the overall arrangement of an example compressed-data processing system.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although preferred embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

For the purpose of data efficiency, native replication often requires that the data be read in a compressed format and then the compressed data be sent over a transmission line. A remote array receives the compressed data in a compact format and then converts it to recover the original layout of the compressed data.

To describe the compressed data, when it is read in a compressed format, the data path (DP) will return compressed metadata. The compressed metadata is a key part of decompression at the destination of replication and includes the length of compressed data, the length of original data, a compression algorithm, parity, and so on. The compressed metadata is also referred to as a compressed-data descriptor (CDD). Typically, the DP compresses user data at a fixed size, e.g., 4 KB, but the compression rate depends on the data mode, usually 1-3 times. In extreme cases, if the length of the compressed data is longer than or equal to that of the original data, it will be stored in its original format without being compressed. To ensure that there is enough space when reading the compressed data, the client terminal still needs to allocate a 4-KB data buffer for each compressed data unit, and also needs to allocate a compressed-data buffer (CDB) array, wherein a CDB contains a CDD to describe the compressed data and a pointer to the data buffer. These CDBs will at least be pointed to by the pointers of IOV entries of an IO vector (IOV) of a compression IO request.

After the compressed read IO request is completed, the compressed metadata will be filled into the CDB array, and the compressed data will be filled into the data buffers.

In order to receive the compressed data packet, a first buffer space needs to be allocated for storing the compressed data packet. After the compressed data packet is stored, a second buffer space needs to be allocated for converting a layout of the compressed metadata and the compressed data included in the compressed data packet. In other words, a total of two allocations of buffer space are required to complete the receiving operation and the conversion operation. Then, the size of the buffer space allocated through two such allocations is often larger than the size of the original data, which leads to the deterioration of the memory efficiency.

Further, it is also necessary to ensure that there is enough buffer space to decompress the compressed data in the DP. The DP uses quick assist technology (QAT) for decompression, and these data buffers are required to support direct memory access (DMA). Therefore, a converter (for example, usher/collator) usually supports DMA memory to convert the original layout of the compressed data. Since the receiver and the converter of a target device use different memory pools, they have different configurations of memory pools, which increases the complexity of configuration of memory pools.

The basic principles and some example implementations of the present disclosure are illustrated below with reference to FIG. 1 to FIG. 10. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of the overall arrangement of example compressed-data processing system 100. As shown in FIG. 1, compressed-data processing system 100 includes source device 110 (used herein as a source compressed-data processing device) and target device 120 (used herein as a target compressed-data processing device). Source device 110 includes transmission unit 111 and storage unit 112, and target device 120 includes transmission unit 121 and storage unit 122. Transmission unit 111 includes sender 113 and converter 114, and transmission unit 121 includes receiver 123 and converter 124, wherein sender 113 is communicatively coupled to receiver 123.

As shown in FIG. 1, converter 114 of source device 110 performs compact processing of the compressed metadata and compressed data from storage unit 112 such that the compressed metadata and the compressed data are merged into a compressed data packet. The compressed data packet is sent via sender 113 to receiver 123 of target device 120. Next, converter 124 processes the received compressed data packet to recover a layout of the compressed metadata and the compressed data. For bandwidth saving purposes, the compact processing of the compressed metadata and the compressed data is performed for sending them to target device 120, and thus, the layout of the compressed metadata and the compressed data received at target device 120 will be different. In order to write the compressed data to the DP, its original layout needs to be recovered.

Figure 2:
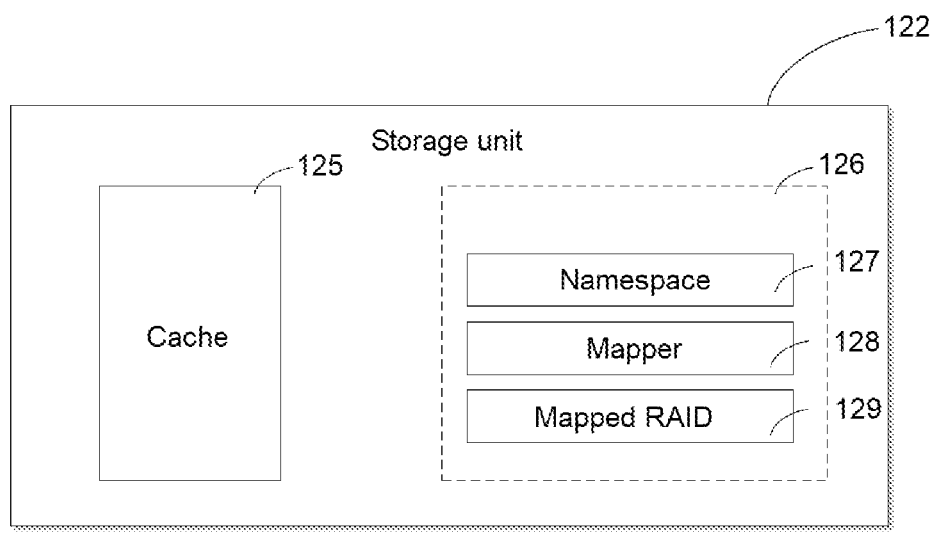
FIG. 2 illustrates a schematic diagram of an example storage unit.

FIG. 2 illustrates a schematic diagram of the specific arrangement of storage unit 122. Storage unit 122 includes cache 125 and includes namespace 127, mapper 128, and mapped RAID 129. Namespace 127, mapper 128, and mapped RAID 129 are referred to as a DP.

Figure 3:
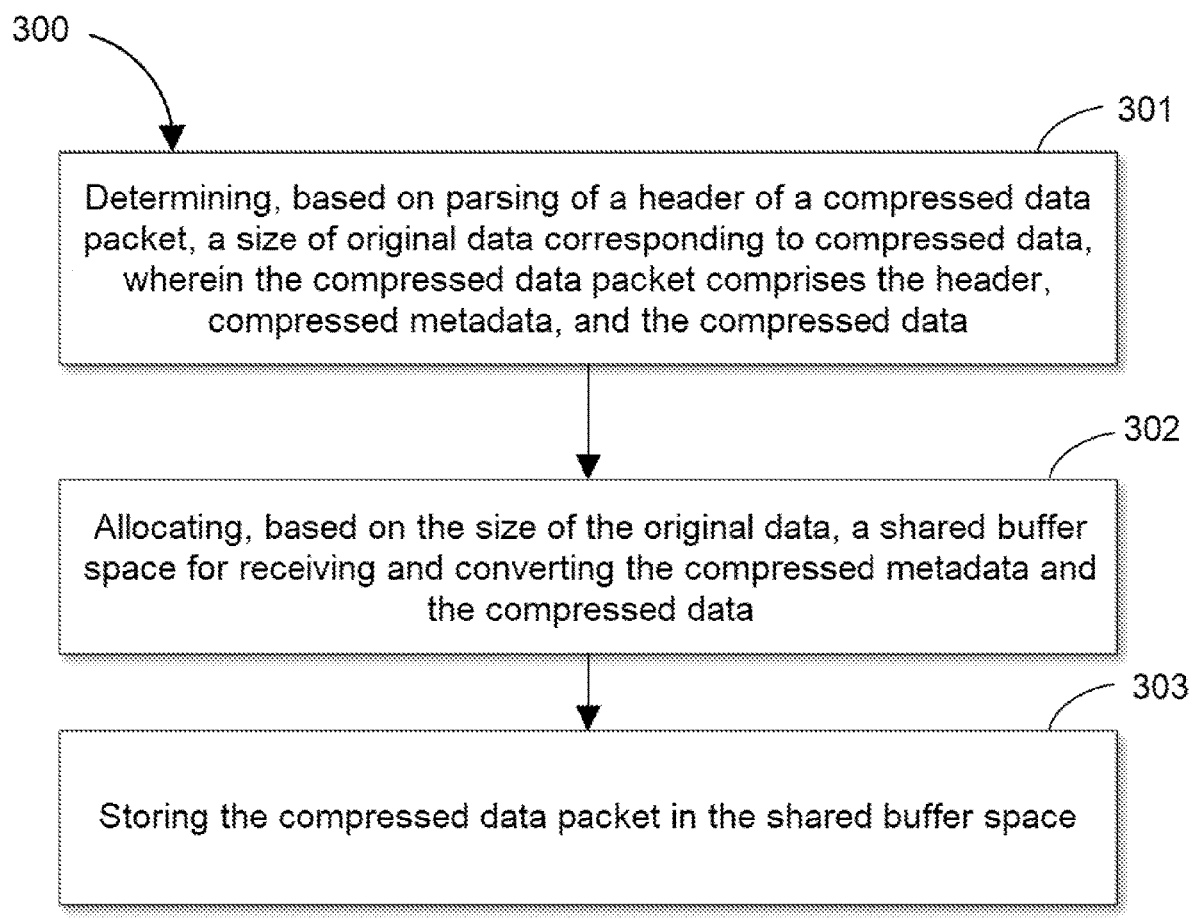
FIG. 3 illustrates a flow chart of a method for processing compressed data according to an embodiment of the present disclosure.

In order to solve at least some of the above problems, the target device provides a method for processing compressed data. FIG. 3 illustrates a flow chart of method 300 for processing compressed data according to an embodiment of the present disclosure.

At 301, based on parsing of a header of a compressed data packet, a size of original data corresponding to compressed data is determined, wherein the compressed data packet includes the header, compressed metadata, and the compressed data. According to the embodiment of the present disclosure, the header of the compressed data packet will first be received, and then the header will be parsed to determine the length of original data of user data before being compressed. According to the embodiment of the present disclosure, in order to improve the memory efficiency, the length of the original data of the user data before being compressed is extracted from a stack frame, wherein the stack frame is stored in the header of the compressed data packet.

At 302, based on the size of the original data, a shared buffer space for receiving and converting the compressed metadata and the compressed data is allocated. The shared buffer space will be used for receiving the compressed data packet, and also for converting the layout of the compressed metadata and the compressed data included in the compressed data packet, and also for other processing, such as decompression processing, for the compressed data. In other words, the shared buffer space according to embodiments of the present disclosure can be used for the receiving, conversion processing, and even other processing of the compressed data at the same time, without allocating separate buffer space for each processing, thereby improving the memory efficiency. Since the allocated shared buffer space is used for both receiving processing and conversion processing, the complexity of configuration of a memory pool is also reduced.

At 303, the compressed data packet is stored in the shared buffer space. Next, the storage of the compressed data packet and the conversion of the compressed metadata and the compressed data included in the compressed data packet will be described in detail. Prior to this, a detailed description will be provided for the compressed data packet according to an embodiment of the present disclosure.

Figure 4:
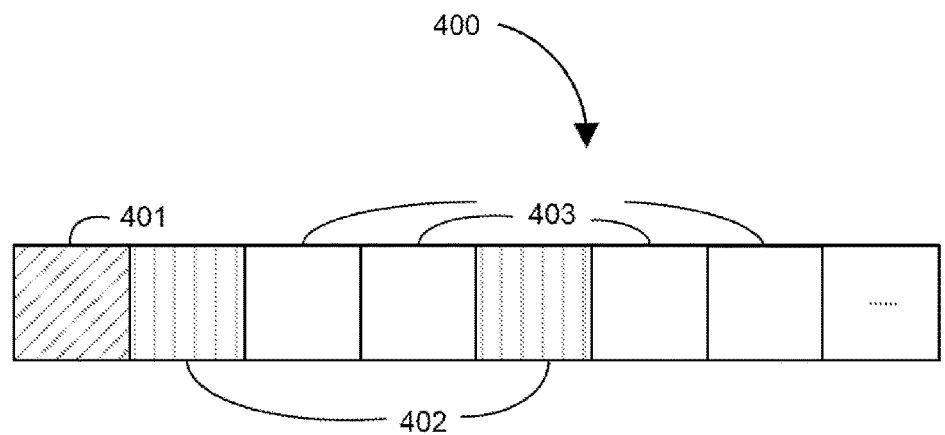
FIG. 4 illustrates a schematic diagram of a compressed data packet according to an embodiment of the present disclosure.

FIG. 4 illustrates a schematic diagram of compressed data packet 400 according to an embodiment of the present disclosure. Referring to FIG. 4, example compressed data packet 400 includes header 401, compressed metadata 402, and compressed data 403. Header 401 in data packet 400 includes an offset from a compression IO request, the length of original data, and an opcode, among others. As shown in FIG. 4, in order to save bandwidth, compressed metadata 402 and compressed data 403 are compressed metadata and compressed data that are merged through compact processing for sending to the target device. Hereinafter, a detailed description will be provided with respect to the compact processing according to an embodiment of the present disclosure.

Figure 5:
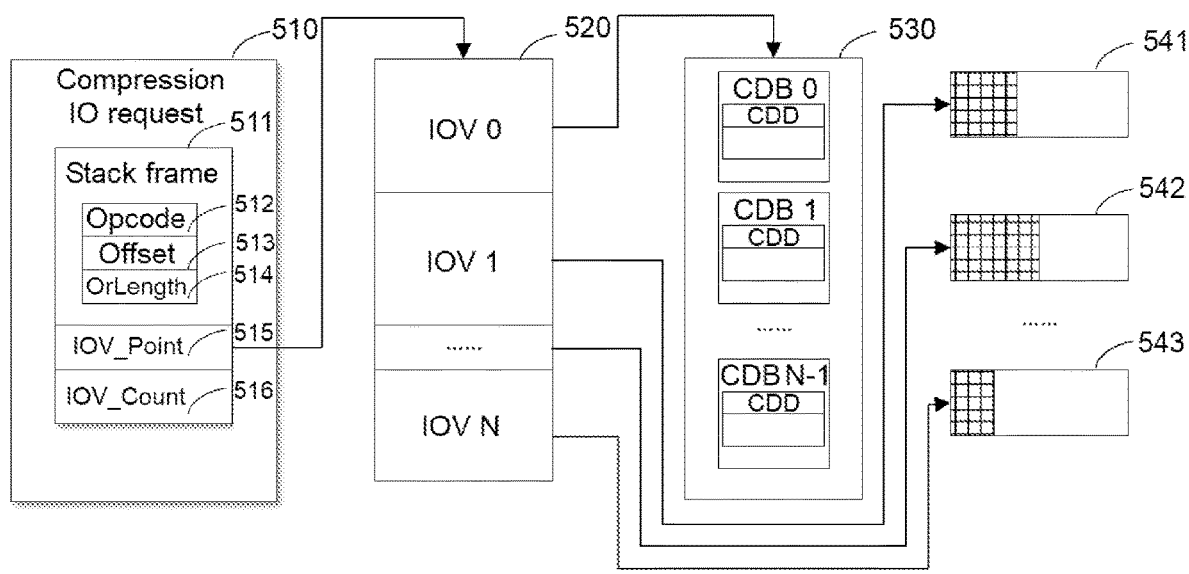
FIG. 5 illustrates a schematic diagram of compact processing of a single compression IO request according to an embodiment of the present disclosure.

FIG. 5 illustrates a schematic diagram of compact processing of a single compression IO request according to an embodiment of the present disclosure. As shown in FIG. 5, compression IO request 510 includes stack frame 511, and stack frame 511 includes an opcode 512, an offset 513, and an original length OrLength 514. OrLength 514 indicates the length of the original data of the user data before being compressed. An IOV pointer IOV_Point 515 points to an IOV, and an IOV count IOV_Count 516 includes a total count of all IOV entries in the IOV. As shown in FIG. 5, the IOV includes IOV entries IOV 0 to IOV N, so IOV_Count 516 is N+1.

As described above, in order to save bandwidth, compact processing is performed on the compressed metadata and the compressed data, such that the compressed metadata and the compressed data are merged for sending to the target device. In the compact processing of a single compression IO request according to the embodiment of the present disclosure, the first IOV entry in IOV entries IOV 0 to IOV N is pointed to CDB array 530, and the remaining IOV entries in IOV entries IOV 0 to IOV N are pointed to corresponding data buffers (e.g., data buffers 541-543), respectively, as shown in FIG. 5. In other words, the IOV entries in the IOV point directly to CDB array 530 storing the compressed metadata and to the corresponding data buffers (e.g., data buffers 541-543) storing the compressed data. In this way, the compressed metadata and the compressed data are merged through compact processing. It should be noted that the compressed data packet includes a header in addition to the compressed metadata and the compressed data. Header message HDR will be added to the header. In the case of a single compression IO request, the stack frame is carried in the HDR, thus allowing the HDR to indicate information corresponding to the offset, original length, and opcode of the compression IO request. The case of a plurality of compression IO requests will be described below, and the same parts as those in the case of a single compression IO request will not be repeated here.

Figure 6:
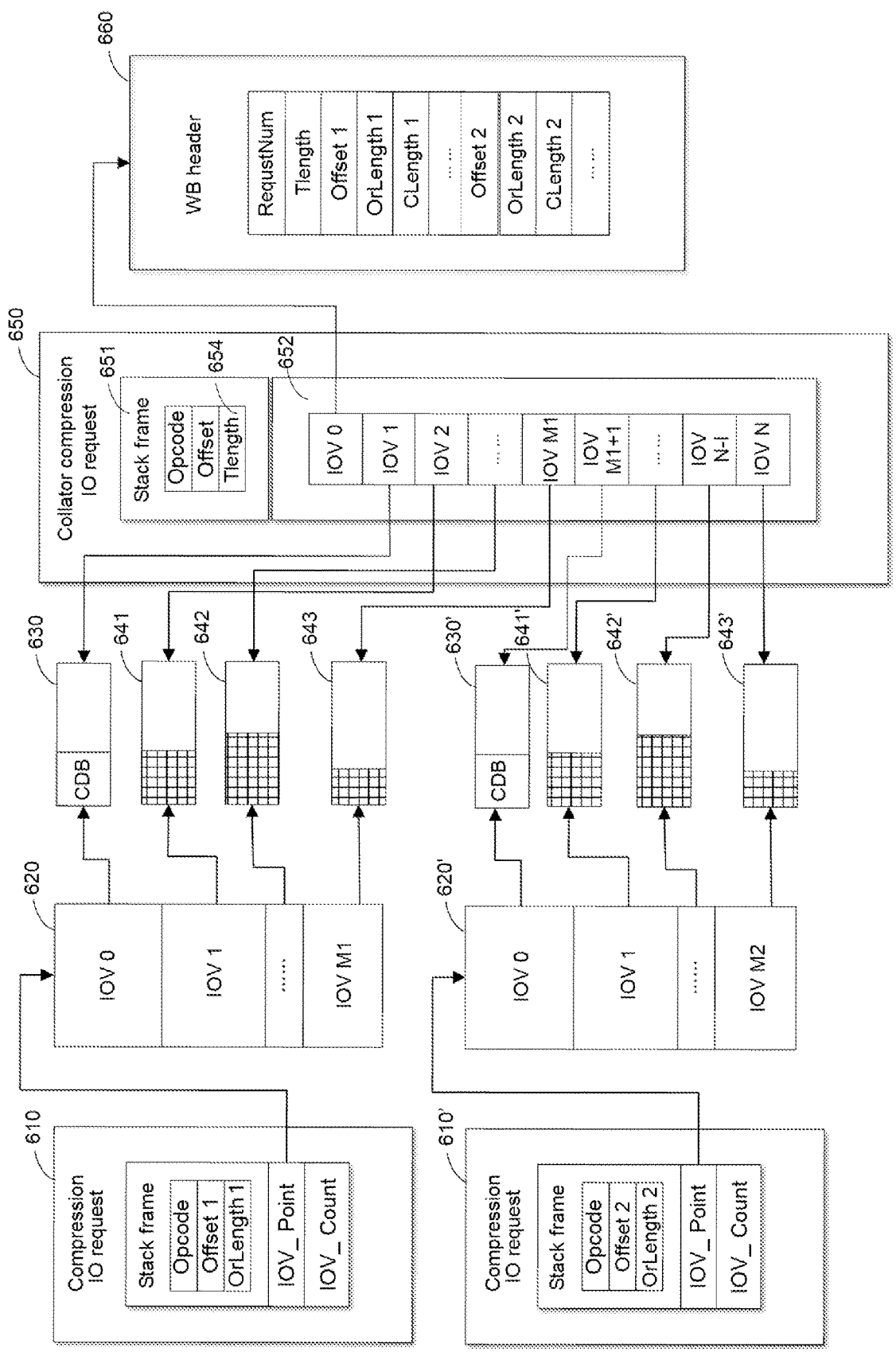
FIG. 6 illustrates a schematic diagram of compact processing of a plurality of compression IO requests according to an embodiment of the present disclosure.

FIG. 6 illustrates a schematic diagram of compact processing of a plurality of compression IO requests according to an embodiment of the present disclosure. 2 compression IO requests are described here by way of example instead of limitation. It will be understood that there may be more compression IO requests. As shown in FIG. 6, compression IO request 610 and compression IO request 610' point to corresponding IOVs 620 and 620' via their corresponding IOV pointers. The IOV entries in IOVs 620 and 620' point to corresponding CDB arrays 630 and 630' and corresponding data buffers (e.g., data buffers 641-643 and 641'-643'). Collator IO request 650 includes stack frame 651, wherein stack frame 651 includes a total length Tlength 654, and Tlength 654 includes the total length of the original data of the user data corresponding to all compression IO requests (i.e., compression IO request 610 and compression IO request 610') before being compressed.

Unlike the case of a single compression IO request, the compact processing of a plurality of compression IO requests according to the embodiment of the present disclosure provides collator IO request 650, wherein this collator IO request 650 includes write buffer (WB) header 660. WB header 660 will be added along with the HDR to the header of the compressed data packet. In the case of a plurality of compression IO requests, the stack frame is carried in the WB header. As shown in FIG. 6, WB header 660 can indicate information corresponding to the total number and total length of the plurality of compression IO requests, and can also indicate information corresponding to the offset, original length, and opcode of each compression IO request. Collator IO request 650 also includes IOV 652. In the compact processing of a plurality of compression IO requests according to the embodiment of the present disclosure, the first entry IOV 0 of IOV 652 is pointed to the WB header and the remaining entries IOV 1-IOV N of IOV 652 are respectively pointed to the corresponding data buffers (e.g., data buffers 641-643 and data buffers 641'-643'). In other words, the IOV entries of IOV 652 of collator IO request 650 point directly to CDB arrays 630 and 630' storing the compressed metadata and to the data buffers (e.g., data buffers 641-643 and data buffers 641'-643') storing the compressed data.

According to the embodiment of the present disclosure, the allocated shared buffer space will be used for the storage of the received compressed metadata and compressed data, for the conversion of the layout of the compressed metadata and the compressed data, for other subsequent uses, etc. No additional buffer space needs to be allocated during the conversion processing and subsequent other processing (e.g., decompression processing).

The memory pool is configured differently for different processing. In order to meet the requirement of supporting DP/QAT DMA, the memory pool is configured to support DMA with respect to the receiving processing, that is, it is configured with a DMA flag. According to the embodiment of the present disclosure, since the allocated shared buffer space is used for both receiving processing and conversion processing, the memory pool is no longer required to be configured to support DMA with respect to the conversion processing. In this way, the size of the memory pool supporting the DMA is saved, because the conversion processing and other processing (e.g., decompression processing) have more memory demands than receiving processing.

According to the embodiment of the present disclosure, allocating the shared buffer space includes: allocating a first page (e.g., a Transit page) of a first size for page alignment in the shared buffer space, and allocating a second page (e.g., a DP page) of a second size (e.g., but not limited to, 4 KB) for storing the compressed metadata and the compressed data in the shared buffer space, wherein the first size is configurable and wherein the first size is greater than the second size. For example, the first size may be several times of the second size. In the case where the first size is greater than the second size, the second page may additionally store transmission information related to the transmission, such as transmission parameters. When the ratio of the first size to the second size is greater than 1, the first page will be split into a plurality of pages for a new IOV.

The improvements to the memory efficiency from the allocation according to the embodiment of the present disclosure will be described specifically below by way of example instead of limitation. Assume that a compression IO request has, for example, a length of original data of 64 KB, a length of compressed data of 30 KB, and a length of compressed metadata of about 0.5 KB (64 KB/4 KB*sizeof (CDB), with the size of the CDB typically being 20-32 bytes). Therefore, at least 30.5 KB of buffer space will be allocated for this compression IO request to receive the compressed data packet. Typically, for page alignment purposes, 32 KB is taken downwards. Then, another 64 KB+4 KB (4 KB here for the CDB array and for the purpose of alignment in the memory pool) will be allocated for this compression IO request to convert the layout of the compressed metadata and the compressed data. Thus, this leads to a total of 32 KB+68 KB=100 KB. However, the compression IO request that needs to be processed has an original length of only 64 KB. Therefore, such approach is not memory efficient.

In the example above, the compression IO request has a length of original data of 64 KB, a length of compressed data of 30 KB, and a length of compressed metadata of about 0.5 KB (but it is in a 4 KB page). If the first size of the first page is 8 KB, the total consumption according to the embodiment of the present disclosure may be 32 KB+8 KB+32 KB (e.g., for subsequent processing)=72 KB, which is almost equivalent to the length of original data. Compared to ordinary processing, there is a saving of 100 KB−72 KB=28 KB, and the memory efficiency is improved by 28%. A detailed description will be given below with respect to the shared buffer space according to the embodiment of the present disclosure.

In summary, the shared buffer space according to embodiments of the present disclosure can be used for the receiving and conversion processing for the compressed data without allocating additional buffer space for each processing, thereby improving the memory efficiency. Since the allocated shared buffer space is used for both receiving processing and conversion processing, the complexity of configuration of a memory pool is also reduced.

Figure 7:
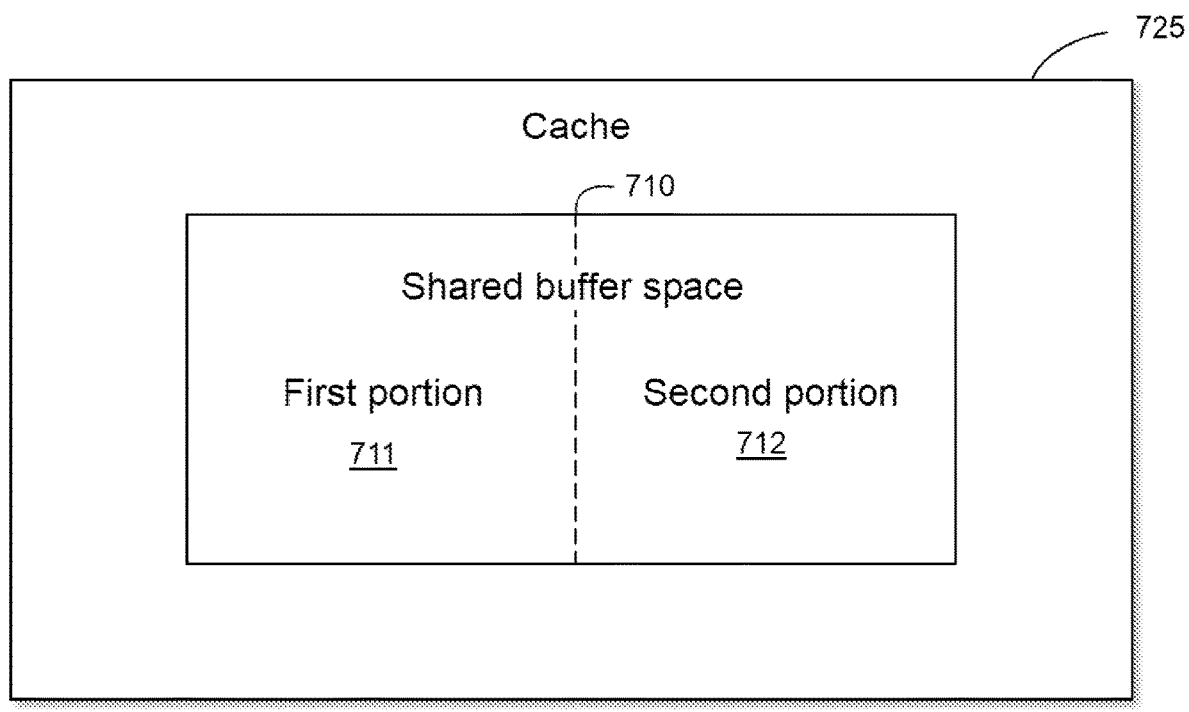
FIG. 7 illustrates a schematic diagram of a shared buffer space according to an embodiment of the present disclosure.

FIG. 7 illustrates a schematic diagram of shared buffer space 710 according to an embodiment of the present disclosure. As described above, shared buffer space 710 according to the embodiment of the present disclosure is allocated in cache 725. Shared buffer space 710 includes first portion 711 and second portion 712. It should be noted that the arrangement of first portion 711 and second portion 712 of shared buffer space 725 shown in FIG. 7 is only an example and not limiting, and first portion 711 and second portion 712 of shared buffer space 725 may have other arrangements.

According to the embodiment of the present disclosure, storing the compressed data packet in the shared buffer space includes: storing the received compressed data packet in first portion 711 of shared buffer space 710, but reserving second portion 712 of shared buffer space 710 for subsequent processing. Further, storing the received compressed data packet in first portion 711 of shared buffer space 710 includes storing the received compressed data packet in first portion 711 of shared buffer space 710 in a reverse-order manner. In this way, data rewriting can be avoided.

As described above, the received compressed data packet is stored in first portion 711 of shared buffer space 710, while second portion 711 of shared buffer space 710 is reserved and not used for storage. The recovery of the layout of the compressed metadata and the compressed data using second portion 711 reserved in shared buffer space 710 will be described below.

It should be noted that, as described above, the page sizes are different for different processing. For example, the first page (e.g., the Transit page) is typically 8 KB, while the second page (the DP page) is 4 KB. In such case, the first page may be shared by two compressed data units. In addition, when iterating over the pages for the data units, a page for page alignment is allocated to skip the unaligned buffers.

Figure 8:
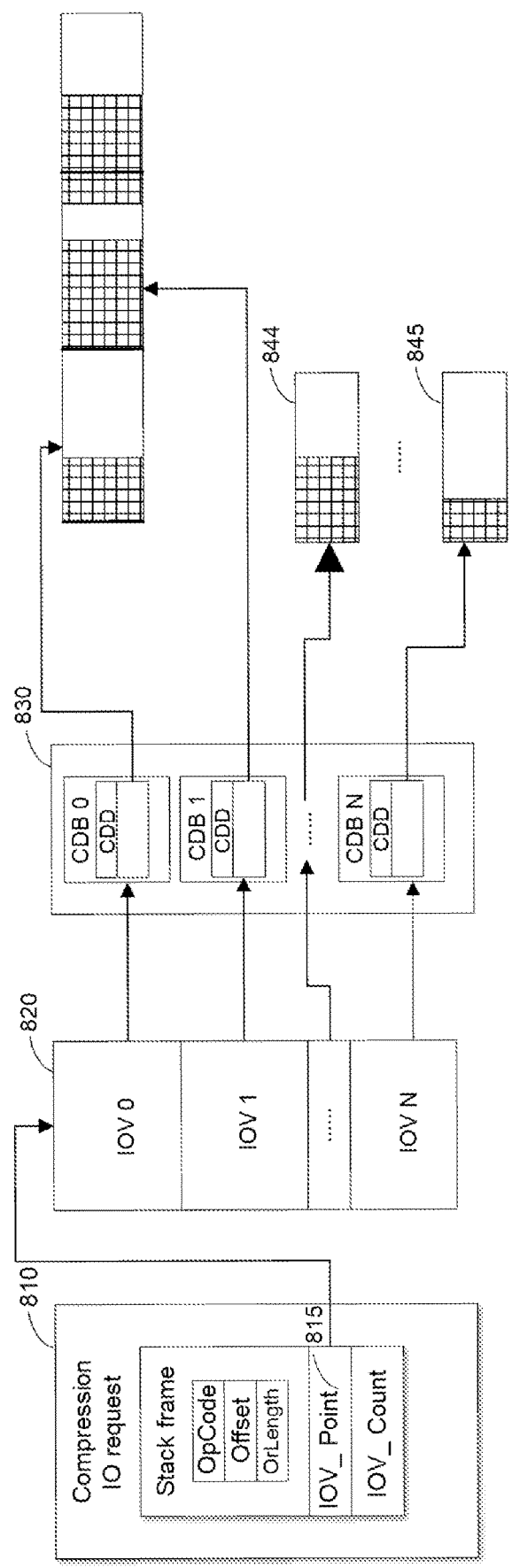
FIG. 8 illustrates a schematic diagram of a conversion layout for a single compression IO request according to an embodiment of the present disclosure.

FIG. 8 illustrates a schematic diagram of a conversion layout for a single compression IO request according to an embodiment of the present disclosure. As shown in FIG. 8, the IOV pointer of compression IO request 810 points to new IOV 820. According to the embodiment of the present disclosure, the conversion layout for a single compression IO request includes pointing the entries of new IOV 820 to a plurality of CDBs in CDB array 830 and pointing each CDB to a corresponding data buffer (e.g., data buffers 844 and 845). The case of a plurality of compression IO requests will be described below, and the same parts as those in the case of a single compression IO request will not be repeated here.

Figure 9:
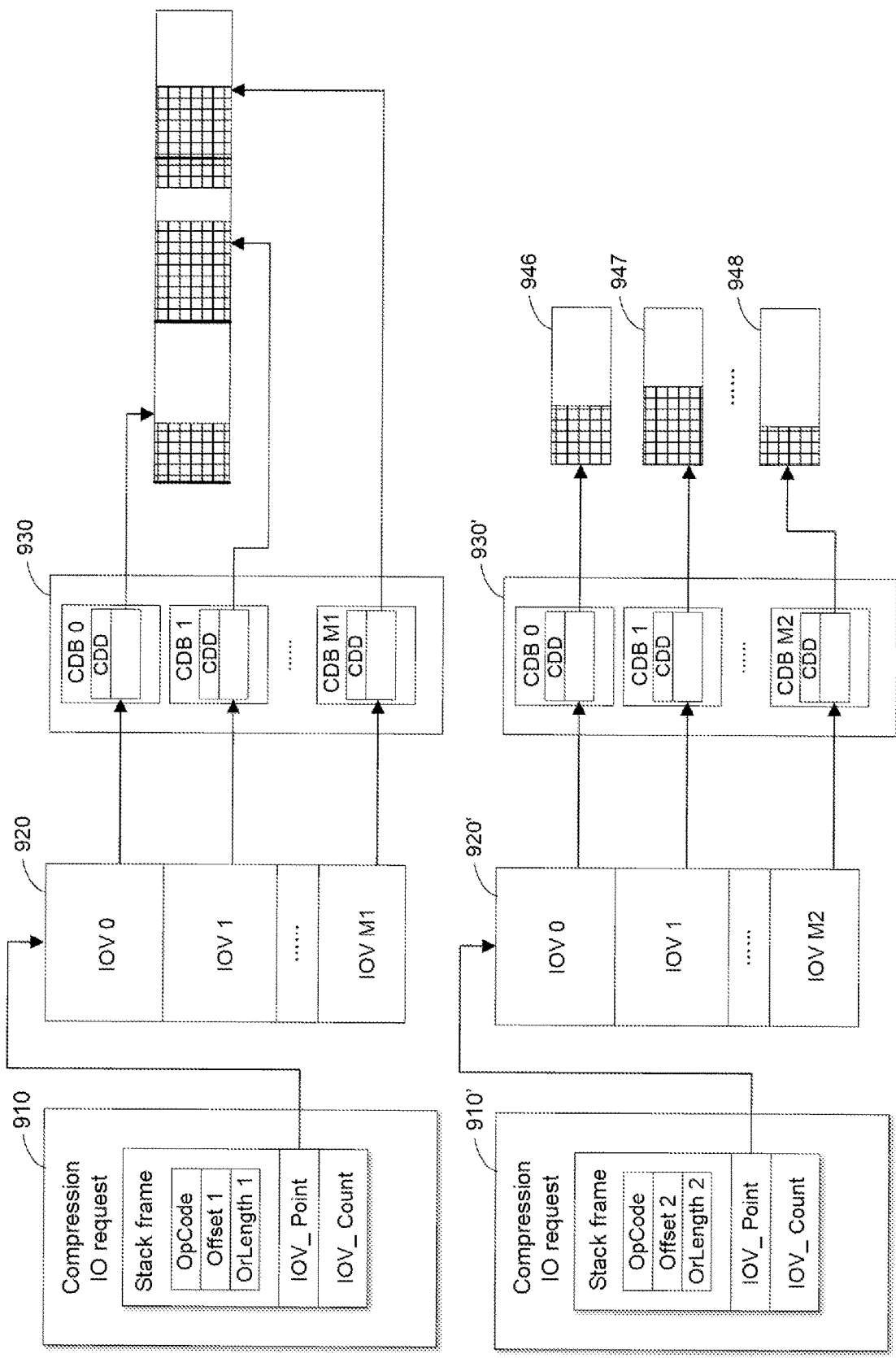
FIG. 9 illustrates a schematic diagram of a conversion layout for a plurality of compression IO requests according to an embodiment of the present disclosure.

FIG. 9 illustrates a schematic diagram of a conversion layout for a plurality of compression IO requests according to an embodiment of the present disclosure. Collator IO requests are omitted herein in order to more clearly describe each compression IO request. As shown in FIG. 9, the IOV pointers of compression IO requests 910 and 910' point to new IOVs 920 and 920'. According to the embodiment of the present disclosure, the conversion layout for a plurality of compression IO requests includes pointing the entries of new IOVs 920 and 920' to a plurality of CDBs in CDB arrays 930 and 930', respectively, and pointing each CDB to a corresponding data buffer (e.g., data buffers 946-948).

It should be noted that in the case of a single compression IO request, one first page is allocated for each compression IO request for use in page alignment, while in the case of a plurality of compression IO requests, one first page is allocated for all IO requests for use in page alignment. Thus, the memory efficiency of the case of a plurality of compression IO requests is slightly better than that of the case of a single compression IO request.

So far, the compressed data packet has been stored in the first portion of the shared buffer space, and the layout of the compressed metadata and the compressed data has been recovered using the second portion of the shared buffer space.

According to the embodiment of the present disclosure, a device for processing compressed data is provided. A detailed description will be given below with respect to the device for processing compressed data according to an embodiment of the present disclosure.

Figure 10:
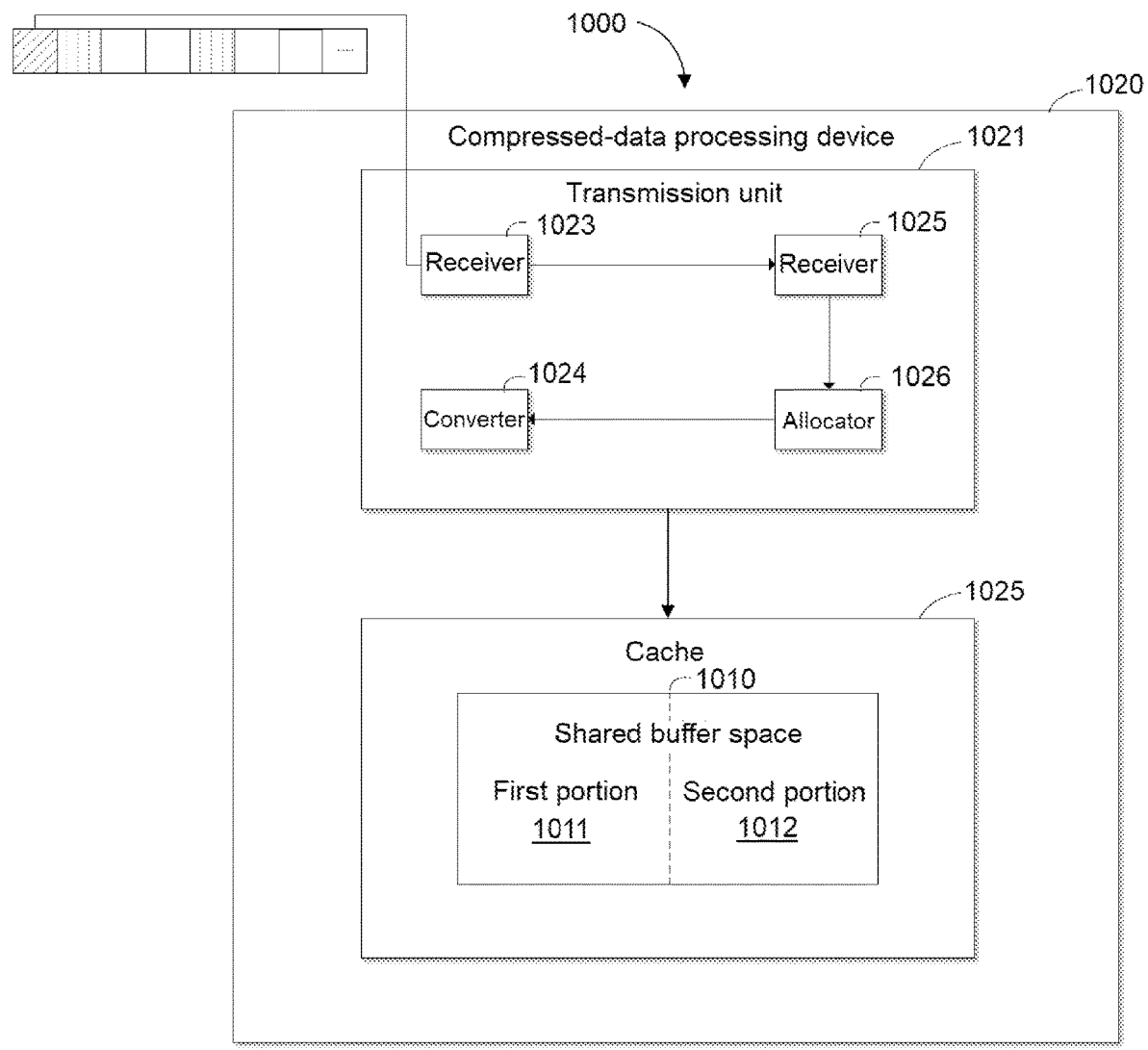
FIG. 10 illustrates a compressed-data processing device according to an embodiment of the present disclosure.

FIG. 10 illustrates compressed-data processing device 1000 according to an embodiment of the present disclosure. Compressed-data processing device 1000 includes transmission unit 1021 and cache 1025. Transmission unit 1021 includes receiver 1023 and converter 1024, and transmission unit 1021, receiver 1023, and converter 1024 may be transmission unit 121, receiver 123, and converter 124 in FIG. 1, and cache 1025 includes first portion 1011 and second portion 1012, and cache 1025, first portion 1011, and second portion 1012 may be cache 710, first portion 711, and second portion 712 in FIG. 7. According to the embodiment of the present disclosure, transmission unit 1021 further includes parser 1025 and allocator 1026.

Receiver 1023 receives a compressed data packet. As described above, the compressed data packet to be received includes compressed metadata and compressed data that are merged through compact processing. The compressed data packet to be received further includes a header that includes an offset, a length of original data, and an opcode, among other things.

According to the embodiment of the present disclosure, when receiver 1023 first receives a header included in the compressed data packet, parser 1025 parses the header to determine the size of original data corresponding to the compressed data.

According to the embodiment of the present disclosure, allocator 1026 allocates shared buffer space 1010 based on the size of the original data determined by parser 1025. As shown in FIG. 10, shared buffer space 1010 is allocated in cache 1025 of compressed-data processing device 1000, wherein this shared buffer space 1010 includes first portion 1011 and second portion 1012.

According to the embodiment of the present disclosure, allocating shared buffer space 1010 includes: allocating a first page of a first size for page alignment in shared buffer space 1010, and allocating a second page of a second size for storing the compressed metadata and the compressed data in shared buffer space 1010, wherein the first size is configurable and wherein the first size is larger than the second size. For example, the first size may be several times of the second size.

After allocating sufficiently sized shared buffer space 1010, receiver 1023 stores the compressed data packet in first portion 1011 of shared buffer space 1010, while second portion 1012 of shared buffer space 1010 is reserved. Receiver 1023 stores the compressed data packet in first portion 1011 of shared buffer space 1010 in a reverse-order manner.

Next, converter 1024 recovers the layout of the compressed metadata and the compressed data using second portion 1012 reserved in shared buffer space 1010. The layout of the compressed metadata and the compressed data includes pointing IOV entries of the IOV to a plurality of CDBs in a CDB array storing the compressed metadata, and pointing each CDB in that plurality of CDBs to a corresponding data buffer storing the compressed data.

Afterwards, the compressed data packet is decompressed to obtain the original data, and the decompressed original data is stored in the shared buffer space. An integrity check is performed on the decompressed original data, and in response to passing the integrity check, the original data is written to the cache.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments, or the technical improvements to technologies on the market, or to enable other persons of ordinary skill in the art to understand the embodiments disclosed here.

The invention claimed is:

1. A method for processing compressed data, comprising:
    determining, based on parsing of a header of a compressed data packet, a size of original data corresponding to compressed data, wherein the compressed data packet comprises the header, compressed metadata, and the compressed data;
    allocating, based on the size of the original data, a shared buffer space for receiving and converting the compressed metadata and the compressed data to recover an original layout of the compressed data and the compressed metadata, wherein the shared buffer space comprises a first portion and a second portion;
    storing the compressed data packet in the shared buffer space at least in part by storing the compressed data packet in the first portion of the shared buffer space and reserving the second portion of the shared buffer space; and
    recovering the original layout of the compressed data and the compressed metadata using the second portion reserved in the shared buffer space at least in part by directing input-output vector (IOV) entries of an IOV to a plurality of compressed-data buffers (CDBs) in a CDB array and directing each CDB of the plurality of CDBs to a corresponding data buffer.

2. The method according to claim 1, wherein allocating the shared buffer space comprises:
    allocating in the shared buffer space a first page of a first size for page alignment; and
    allocating in the shared buffer space a second page of a second size for storing the compressed metadata and the compressed data, wherein the first size is greater than the second size.

3. The method according to claim 2, wherein storing the compressed data packet in the first portion of the shared buffer space comprises:
    storing the compressed data packet in the first portion of the shared buffer space in a reverse-order manner.

4. The method according to claim 1, wherein the compressed data packet comprises the compressed metadata and the compressed data that are merged through compact processing.

5. The method according to claim 1, further comprising:
    decompressing the compressed data packet to obtain the original data; and
    storing the decompressed original data in the shared buffer space.

6. The method according to claim 5, further comprising:
    performing an integrity check on the decompressed original data; and
    writing the original data to a cache in response to passing the integrity check.

7. A device for processing compressed data, comprising:
    a processor, and
    a memory coupled to the processor and storing instructions, wherein the instructions, when executed by the processor, cause the device to execute the following actions:

determining, based on parsing of a header of a compressed data packet, a size of original data corresponding to compressed data, wherein the compressed data packet comprises the header, compressed metadata, and the compressed data;

allocating, based on the size of the original data, a shared buffer space for receiving and converting the compressed metadata and the compressed data to recover an original layout of the compressed data and the compressed metadata, wherein the shared buffer space comprises a first portion and a second portion;

storing the compressed data packet in the shared buffer space at least in part by storing the compressed data packet in the first portion of the shared buffer space and reserving the second portion of the shared buffer space; and recovering the original layout of the compressed data and the compressed metadata using the second portion reserved in the shared buffer space at least in part by directing input-output vector (IOV) entries of an IOV to a plurality of compressed-data buffers (CDBs) in a CDB array and directing each CDB of the plurality of CDBs to a corresponding data buffer.

8. The device according to claim 7, wherein allocating the shared buffer space comprises:

allocating in the shared buffer space a first page of a first size for page alignment; and allocating in the shared buffer space a second page of a second size for storing the compressed metadata and the compressed data, wherein the first size is greater than the second size.

9. The device according to claim 8, wherein storing the compressed data packet in the first portion of the shared buffer space comprises:

storing the compressed data packet in the first portion of the shared buffer space in a reverse-order manner.

10. The device according to claim 7, wherein the compressed data packet comprises the compressed metadata and the compressed data that are merged through compact processing.

11. The device according to claim 7, wherein the actions further comprise:

decompressing the compressed data packet to obtain the original data; and storing the decompressed original data in the shared buffer space.

12. The device according to claim 11, wherein the actions further comprise:

performing an integrity check on the decompressed original data; and writing the original data to a cache in response to passing the integrity check.

13. A computer program product having a non-transitory computer readable medium which stores a set of instructions for processing compressed data; the set of instructions, when carried out by computerized circuitry, causing the computerized circuitry to perform a method of:

determining, based on parsing of a header of a compressed data packet, a size of original data corresponding to compressed data, wherein the compressed data packet comprises the header, compressed metadata, and the compressed data;

allocating, based on the size of the original data, a shared buffer space for receiving and converting the compressed metadata and the compressed data to recover an original layout of the compressed data and the compressed metadata, wherein the shared buffer space comprises a first portion and a second portion;

storing the compressed data packet in the shared buffer space at least in part by storing the compressed data packet in the first portion of the shared buffer space and reserving the second portion of the shared buffer space; and recovering the original layout of the compressed data and the compressed metadata using the second portion reserved in the shared buffer space at least in part by directing input-output vector (IOV) entries of an IOV to a plurality of compressed-data buffers (CDBs) in a CDB array and directing each CDB of the plurality of CDBs to a corresponding data buffer.

* * * * *